US009159203B2

(12) United States Patent
Priesterjahn et al.

(10) Patent No.: US 9,159,203 B2
(45) Date of Patent: Oct. 13, 2015

(54) AUTOMATED TELLER MACHINE COMPRISING AT LEAST ONE CAMERA THAT PRODUCES IMAGE DATA TO DETECT MANIPULATION ATTEMPTS

(75) Inventors: Steffen Priesterjahn, Paderborn (DE); Dinh-Khoi Le, Paderborn (DE); Michael Nolte, Brakel (DE); Alexander Drichel, Bielefeld (DE)

(73) Assignee: Wincor Nixdorf International GmbH (DE)

( * ) Notice: Subject to any disclaimer, the term of this patent is extended or adjusted under 35 U.S.C. 154(b) by 365 days.

(21) Appl. No.: 13/264,144

(22) PCT Filed: Apr. 16, 2010

(86) PCT No.: PCT/EP2010/055014
§ 371 (c)(1),
(2), (4) Date: Oct. 12, 2011

(87) PCT Pub. No.: WO2010/121957
PCT Pub. Date: Oct. 28, 2010

(65) Prior Publication Data

US 2012/0038775 A1 Feb. 16, 2012

(30) Foreign Application Priority Data

Apr. 22, 2009 (DE) ......................... 10 2009 018 318

(51) Int. Cl.
*H04N 7/18* (2006.01)
*G06Q 40/00* (2012.01)
*G07F 19/00* (2006.01)

(52) U.S. Cl.
CPC ............. *G07F 19/207* (2013.01); *G07F 19/20* (2013.01)

(58) Field of Classification Search
CPC ... G07F 19/20; G07F 19/207; G06K 9/00791; H04N 2201/327; H04N 5/23248; H04N 5/23254; H04N 5/23267; H04N 5/23287
USPC ......... 348/150, 208.4; 235/379; 382/100, 104
See application file for complete search history.

(56) References Cited

U.S. PATENT DOCUMENTS 7,881,497 B2 * 2/2011 Ganguli et al. ............... 382/104
7,948,538 B2 * 5/2011 Asoma .......................... 348/297

(Continued)

FOREIGN PATENT DOCUMENTS

DE 20102477 U1 5/2001
DE 20318489 U1 2/2004

(Continued)

OTHER PUBLICATIONS

International Preliminary Report on Patentability (Chapter I of the Patent Cooperation Treaty) in German (with English translation) for PCT/EP2010/055014, issued Oct. 25, 2011.

(Continued)

*Primary Examiner* — Dave Czekaj
*Assistant Examiner* — Tsion B Owens
(74) *Attorney, Agent, or Firm* — Harness, Dickey & Pierce, P.L.C.

(57) ABSTRACT

An automated teller machine is proposed having at least one camera to detect manipulation attempts that captures images of one or more elements arranged in the control panel, such as a keypad, cash-dispensing drawer, card entry slot and generates image data from a plurality of individual image recordings (F1, F2, F3). The at least one camera is connected to a data processing unit that preprocesses the image data generated (individual image data) into a resulting image (R). The preprocessed image data of the resulting image (R) can be computed, for example, by exposure blending from the individual images (F1, F2, F3) and represent a very good data base for data evaluation to detect manipulation.

22 Claims, 9 Drawing Sheets

(56) References Cited

U.S. PATENT DOCUMENTS

| | | | | |
|---|---|---|---|---|
| 2008/0266424 | A1 | 10/2008 | Asoma | |
| 2009/0201372 | A1* | 8/2009 | O'Doherty et al. | 348/150 |
| 2010/0259626 | A1* | 10/2010 | Savidge | 348/208.4 |

FOREIGN PATENT DOCUMENTS

| | | | | | |
|---|---|---|---|---|---|
| GB | 2351585 | A | * | 1/2001 | G07F 19/00 |
| GB | 2351585 | A | | 1/2001 | |
| WO | WO-2007093977 | A1 | | 8/2007 | |

OTHER PUBLICATIONS

International Search Report (in German with English Translation) for PCT/EP2010/055014, mailed Sep. 16, 2010; ISA/EP.

English translation of Chinese Office Action for Application No. 2010-80027721.1 dated Mar. 25, 2014 (4 pages).

* cited by examiner

AUTOMATED TELLER MACHINE COMPRISING AT LEAST ONE CAMERA THAT PRODUCES IMAGE DATA TO DETECT MANIPULATION ATTEMPTS

CROSS-REFERENCE TO RELATED APPLICATIONS

This application is a National Stage of International Application No. PCT/EP2010/055014, filed Apr. 16, 2010, and published in German as WO 2010/121957 A1 on Oct. 28, 2010. This application claims the benefit and priority of German application 10 2009 018 318.3, filed Apr. 22, 2009. The entire disclosures of the above applications are incorporated herein by reference.

BACKGROUND

This section provides background information related to the present disclosure which is not necessarily prior art.

1. Technical Field

The invention relates to an automated teller machine comprising at least one camera that produces image data. In particular, the invention relates to an automated teller machine that is configured as a cash dispenser.

2. Discussion

In the area of self-service automats, in particular cash dispensers, criminal activities in the form of manipulation are frequently undertaken with the goal of spying out sensitive data, in particular PINs (personal identity numbers) and/or card numbers of users of the automated teller machine. Manipulation attempts are known specifically in which so-called skimming devices, such as keypad overlays and similar, are installed illegally in the operating area or on the control panel. Such keypad overlays often have their own power supply, as well as a processor, a memory and an operating program so that an unsuspecting user is spied on when entering his PIN or inserting his bank card. The data mined in this way are then sent over a transmitter integrated into the keypad overlay to a remote receiver or stored in a memory in the overlay. Many of the skimming devices encountered today can be distinguished only with great difficulty by the human eye from original controls (keypad, card reader, etc.).

In order to frustrate such manipulation attempts, surveillance systems are often used that have one or more cameras installed close to the site of the automated teller machine and capture images of the entire control panel and often the area occupied by the user as well. One such solution is described in DE 201 02 477 U1. Images of both the control panel and the user area immediately in front of said panel can be captured using camera surveillance. One additional sensor is provided in order to distinguish whether a person is in the user area.

An object of the present invention is to propose a solution for camera surveillance that allows reliable detection of manipulation attempts even without the use of an additional sensor system. As part of this a high-quality data base is to be created and provided for the detection of manipulation attempts.

Accordingly, an automated teller machine is proposed in which at least one camera is provided generating image data for surveillance of the automated teller machine, wherein to detect manipulation attempts at the automated teller machine the at least one camera captures images of one or more of the elements provided in the control panel and generates image data from several individual images, and wherein the camera is connected to a data processing unit that preprocesses the image data generated into a resulting image that helps with manipulation detection. Preferably the at least one camera generates the image data from the individual images as a function of predefined criteria, specifically at predefined time intervals and/or under different lighting conditions, or ambient brightness. Predefined camera settings, particularly exposure times and/or image rates can be taken into account. The data processing unit combines these image data (individual image data) using image data preprocessing, specifically creating an average, creating a median and/or what is termed exposure blending into the resulting image, or total image, that is then available for manipulation detection. Resulting or total images (resulting image sequence) can be computed continuously at intervals to be available for a comparison to detect manipulation attempts.

At least one additional camera can be provided that is similarly mounted at or in the automated teller machine in close proximity to the control panel and captures images of at least one of the control elements, such as the keypad, card entry slot, money dispensing compartment. The image data, or individual recordings, generated by this additional camera can, in conjunction with image data from the other camera, be combined into a sequence of resulting images.

The resulting images obtained from the individual images exhibit a substantially higher image data quality than the respective individual images. A high-quality data base in the form of preprocessed image data is prepared for manipulation detection.

In so doing, it may be advantageous if the multiple individual image recordings are generated depending on at least one predefined function that sets different exposure times for the individual image recordings. This ensures that no individual image recordings are made with the same exposure time, which in turn is advantageous for exposure blending. In this context, provision can be made for the at least one predefined function to match at least one ramp function that sets increasing and/or decreasing exposure times for a series of individual image recordings. In accordance with this, the first individual image recording starts with the shortest exposure time of 0.5 ms, as an example, and with the subsequent recordings the exposure time is successively increased until, with the final image, a maximum exposure time of 2000 ms, for example, has been reached. Alternatively, the ramp can run downward, i.e. the exposure times trend downward, i.e. become successively shorter. The total duration of all individual image recordings can also be predetermined and be, for example, 10 seconds. It is also of advantage if one of the predefined functions specifies the different exposure times in such a way that they lie within a specific valuation range, for example within a first lower valuation range that extends from 0.5 ms to 1000 ms. This valuation range is preferably applied to what is known as the day mode, i.e. for the event that a brightness and/or contrast value from at least one of the individual image recordings exceeds a predefined threshold value. In night mode, i.e. when a brightness and/or contrast value of at least one of the individual image recordings falls below a predefined threshold value, the different exposure times are grouped within a second upper valuation range that may extend from 1000 ms to 2000 ms. The functions can also be combined into a function sequence.

Consequently it is also of advantage if the at least one camera generates image data for the individual image recordings dependent on events, particularly on events captured by this or by another camera. Such events may be, for example, sudden brightening or darkening of the image. Another example may be operating signals (actuation of the keypad or similar). In this respect it may be advantageous if individual image recordings are made not (only) while the event is taking place but also thereafter.

The data processing unit preferably combines the image data generated from the individual image recordings using one or more suitable image data processing methods, i.e. exposure blending. Image segmenting and/or edge detection can also be used. In this connection it is of advantage if the data processing unit segments the individual image recordings into several sub-regions assigned to the at least one captured element and processes the individual image data differently by segment. Provision can be made for the data processing unit to compile the resulting image from the sub-regions of different individual image recordings. Provision can also be made for the data processing unit to process the image data from the sub-regions using different image processing methods and/or using different variations of image data processing. The sub-regions preferably include at least a close-up or interior region and a surrounding or outer region of the captured elements, such as the slit area and the surrounding region of a card entry slot. Provision can also be made for one of the sub-regions to include a transitional region between the inner region and the outer region of the element.

The data processing unit is preferably designed in such a way that it performs both the image data preprocessing as well as the actual image data evaluation, i.e. that it computes from the individual image data the preprocessed image data for the resulting image and evaluates said data to detect manipulation attempts using image processing. To do this, the data processing unit has at its disposal a first stage receiving the preprocessed image data for the actual image processing or image data evaluation, where specifically shadow removal, edge detection, vectorizing and/or segmenting can be carried out. The data processing unit also has a second stage downstream from the first stage for feature extraction, specifically using blob analysis, edge position and/or color distribution. The data processing additionally has a third stage downstream from the second stage for classification.

The data processing unit is preferably integrated into the self-service terminal.

The elements provided in the control panel of the self-service terminal, images of which are captured by the at least one camera, include, for example, a cash dispensing drawer, a keypad, an installation panel, a card insert slot, and/or a monitor. Provision is also made for the data processing unit to trigger an alarm, disable the self-service terminal and/or trigger the additional camera when it detects a manipulation attempt at the captured elements by processing the preprocessed image data of the resulting image. This additional camera can be a portrait camera, i.e. a camera that captures an image of that area in which the user, or more specifically his head, is positioned while using the self-service terminal. In this way a portrait of the user can be taken if the need arises. It is also intended that the particular camera and/or the data processing unit is/are deactivated during operation and/or maintenance of the self-service terminal.

BRIEF DESCRIPTION OF THE DRAWINGS

The invention and the advantages resulting therefrom are described hereinafter using embodiments and with reference to the accompanying schematic drawings.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
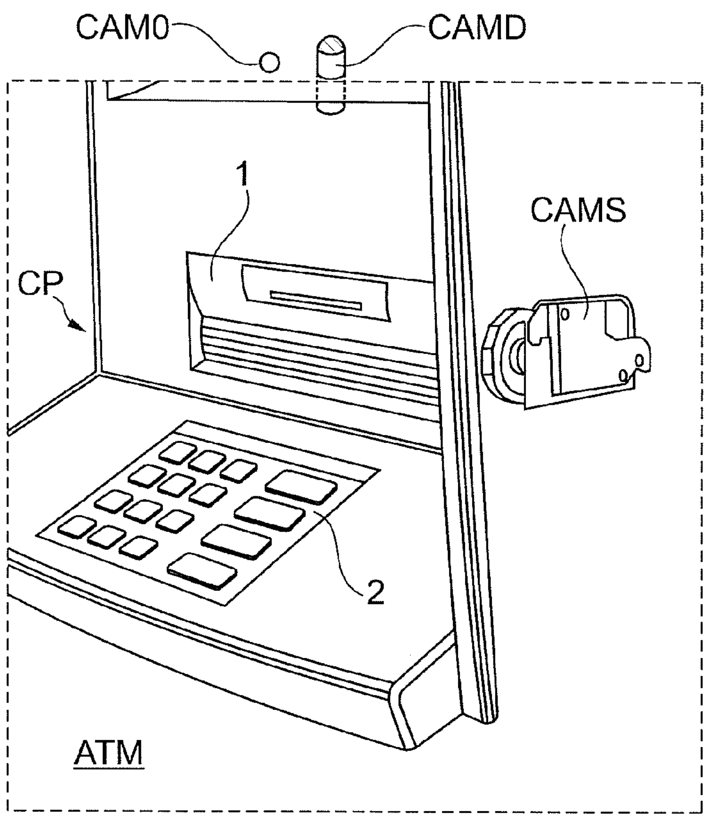
FIG. 1 shows a perspective view of the control panel of an automated teller machine with several cameras.

FIG. 1 shows in a perspective view the basic structure of a self-service terminal in the form of an automated teller machine. The automated teller machine ATM control panel includes in particular a cash dispensing drawer 1, also called a shutter, and a keypad 2, i.e. control elements which can be favorites for manipulation attempts in the form of overlays, for example, for the purpose of skimming. The automated teller machine ATM is equipped with several cameras for detecting these and similar manipulation attempts.

FIG. 1 shows first those cameras that are mounted at different locations, preferably in the vicinity of the control panel. Said cameras are a side camera CAMS, a top view camera CAMD and an additional portrait camera CAMO.

Cameras CAMS and CAMD are located are located within a boundary, frame or similar and are mounted there. Each of these cameras CAMS or CAMD captures images from the outside in each case of at least one of the elements arranged in the control panel of the automated teller machine, for example the cash dispensing drawer 1 (shutter) and/or the keypad 2. The lateral camera CAMS preferably captures images of precisely these two elements 1 and 2; the top view camera CAMD captures images of still more elements in addition (see also FIG. 6). In contrast, a camera CAMK integrated into the card entry slot 4 captures images of the interior region of this element. This camera CAMK and its function will be described later in detail using FIGS. 7*a/b.*

Besides the cameras positioned immediately at or in the control panel, the additional camera CAMO is located in the upper housing section of the automated teller machine ATM and is directed at the area in which the user stands when operating the automated teller machine. In particular this camera CAMO captures images of the head or face of the user and is therefore described here also as a portrait camera.

Figure 2:
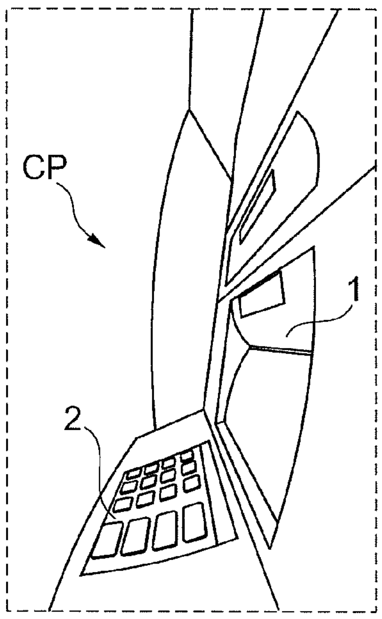
FIG. 2 reproduces the coverage area of the camera from FIG. 1 that captures images of the control panel from the side.

FIG. 2 shows the coverage area of camera CAMS that is located in a lateral part of the housing that frames or surrounds the control panel of the automated teller machine ATM. The cash dispensing drawer 1 and the keypad 2 specifically are in the angle of vision of this lateral camera CAMS. This camera CAMS in particular is equipped with a wide-angle lens in order to capture images of at least these two elements or sub-regions of the control panel. The automated teller machine ATM is constructed such that elements 1 and 2 already mentioned preferably have the most homogenous surfaces possible with edges delimiting said surfaces. This simplifies object recognition. By mounting camera CAMS in this particularly suitable position, the named sub-regions or elements 1 and 2 can be measured optically with a high degree of reliability. Provision can be made for the camera to be focused sharply on specific areas.

Figure 6:
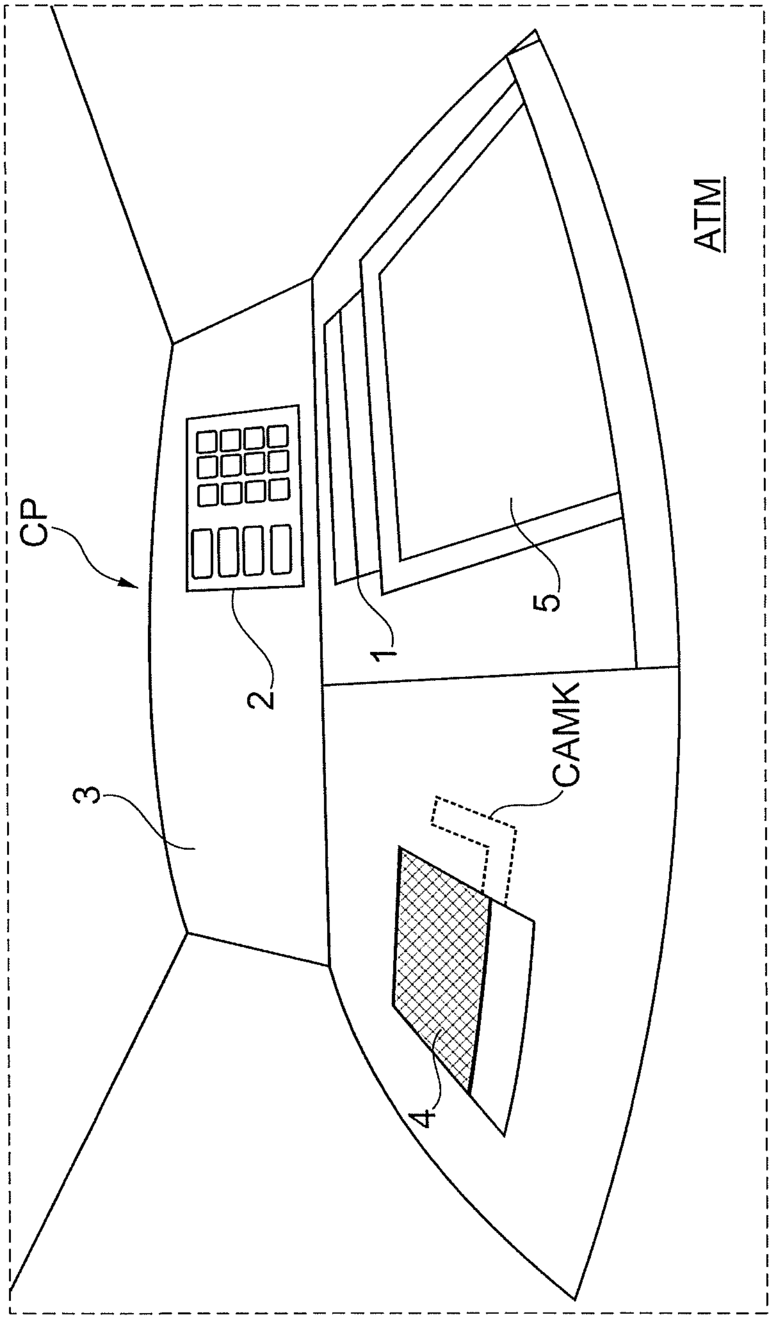
FIG. 6 reproduces the coverage area of the camera from FIG. 1 that captures images of the control panel from above.
Figure 7A:
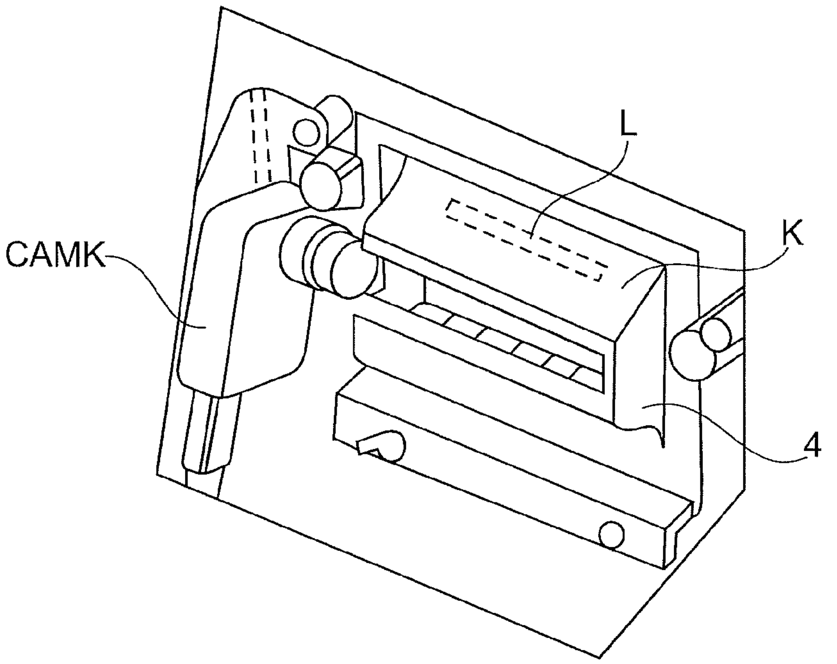
FIG. 7*a* shows the installation location of the camera that is integrated into the card insert slot.

A different perspective, that of the top view camera CAMD, is clarified using FIG. 6. The Figure illustrates the coverage field of this camera CAMD that is installed in the upper area of the automated teller machine ATM (see also FIG. 1) and captures images of the control panel from above. Still further elements can be included in the coverage area of the camera beside the cash dispensing drawer 1 and the keypad 2, including examples such as an installation panel in the vicinity of the keypad, a card insert slot 4, i.e. the feed for the card reader, and a monitor 5 or display. These additional elements mentioned 3, 4, 5 represent potential targets for manipulation attempts.

Figure 3:
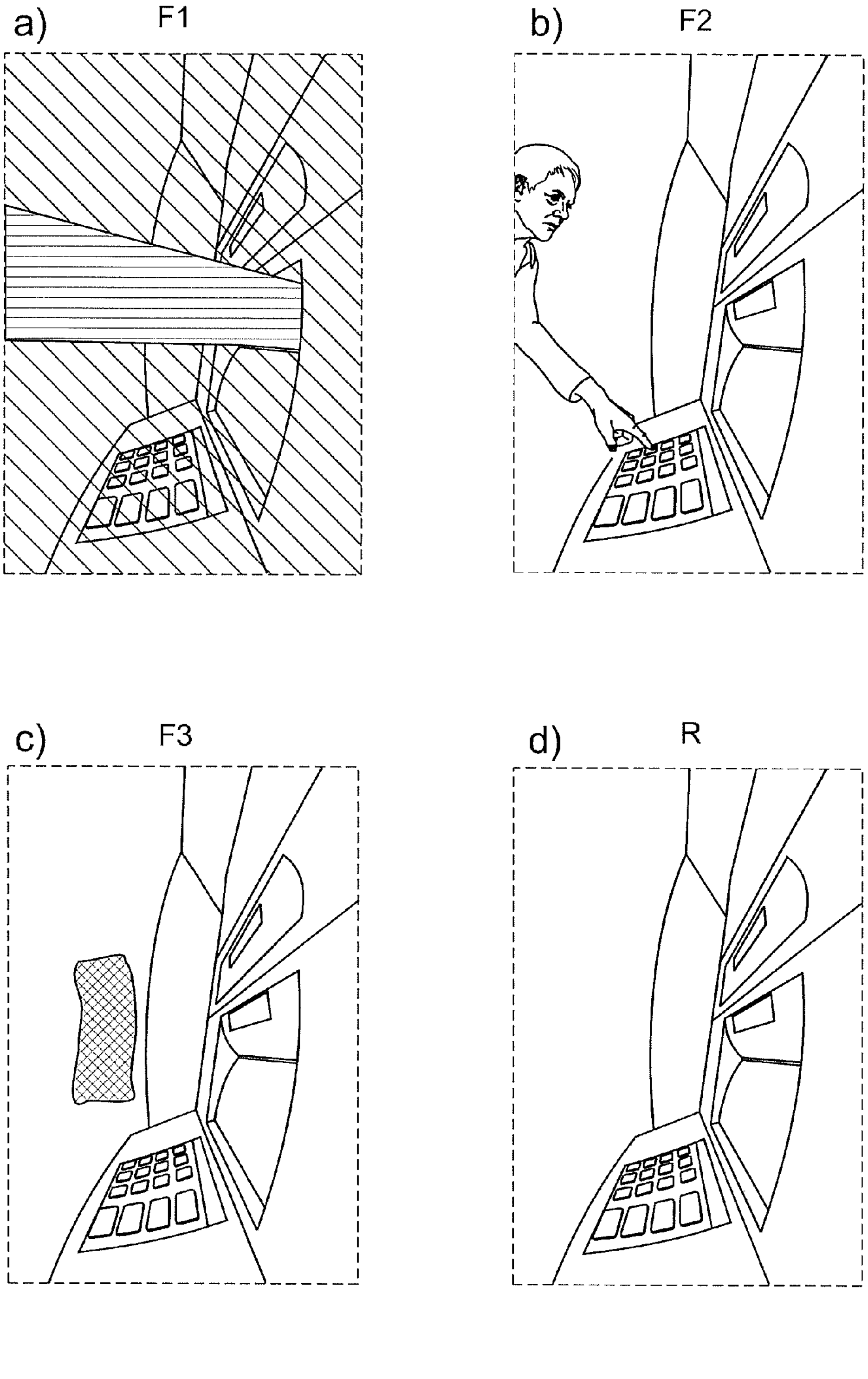
FIGS. 3*a-d* show three individual image recordings as examples and a resulting image obtained therefrom.
Figure 4:
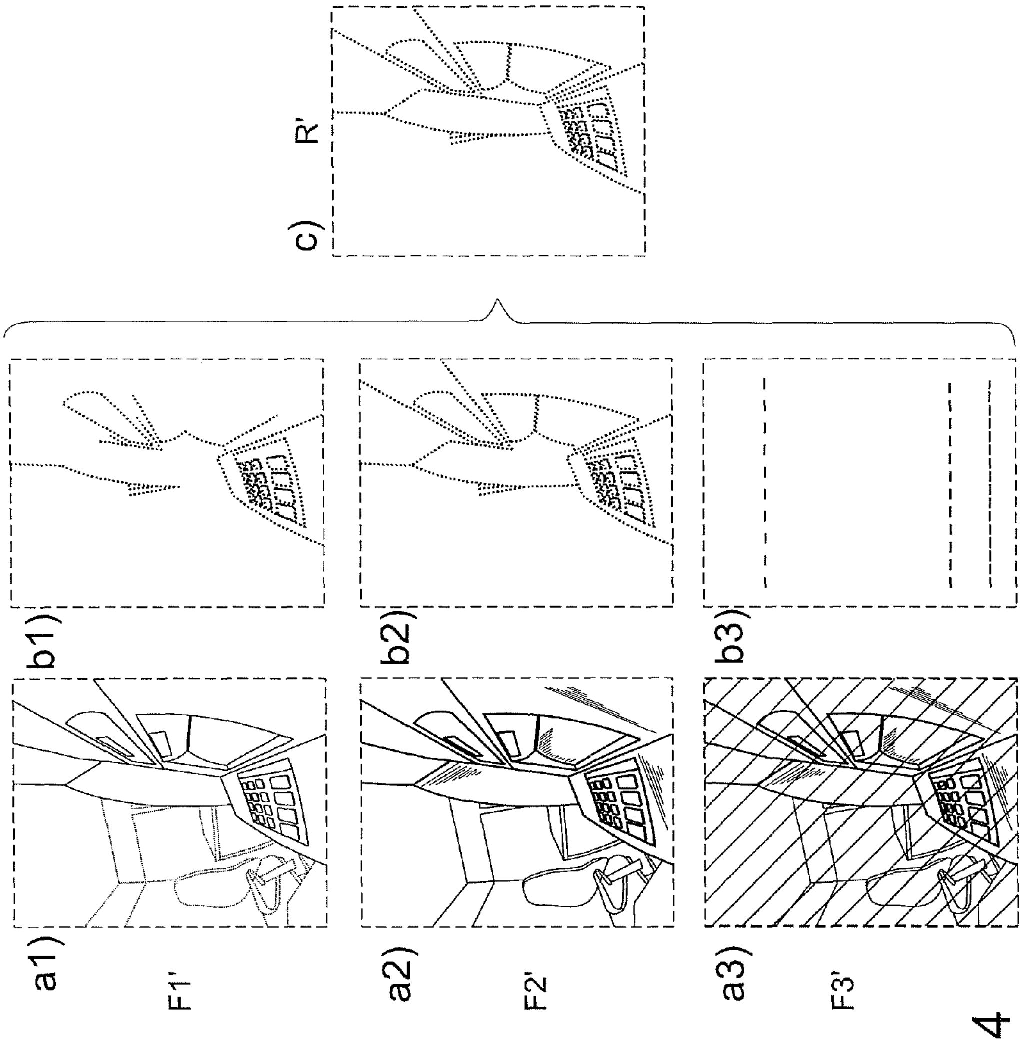
FIG. 4 illustrates image data processing of several individual images using edge detection and combination into a resulting image.
Figure 5:
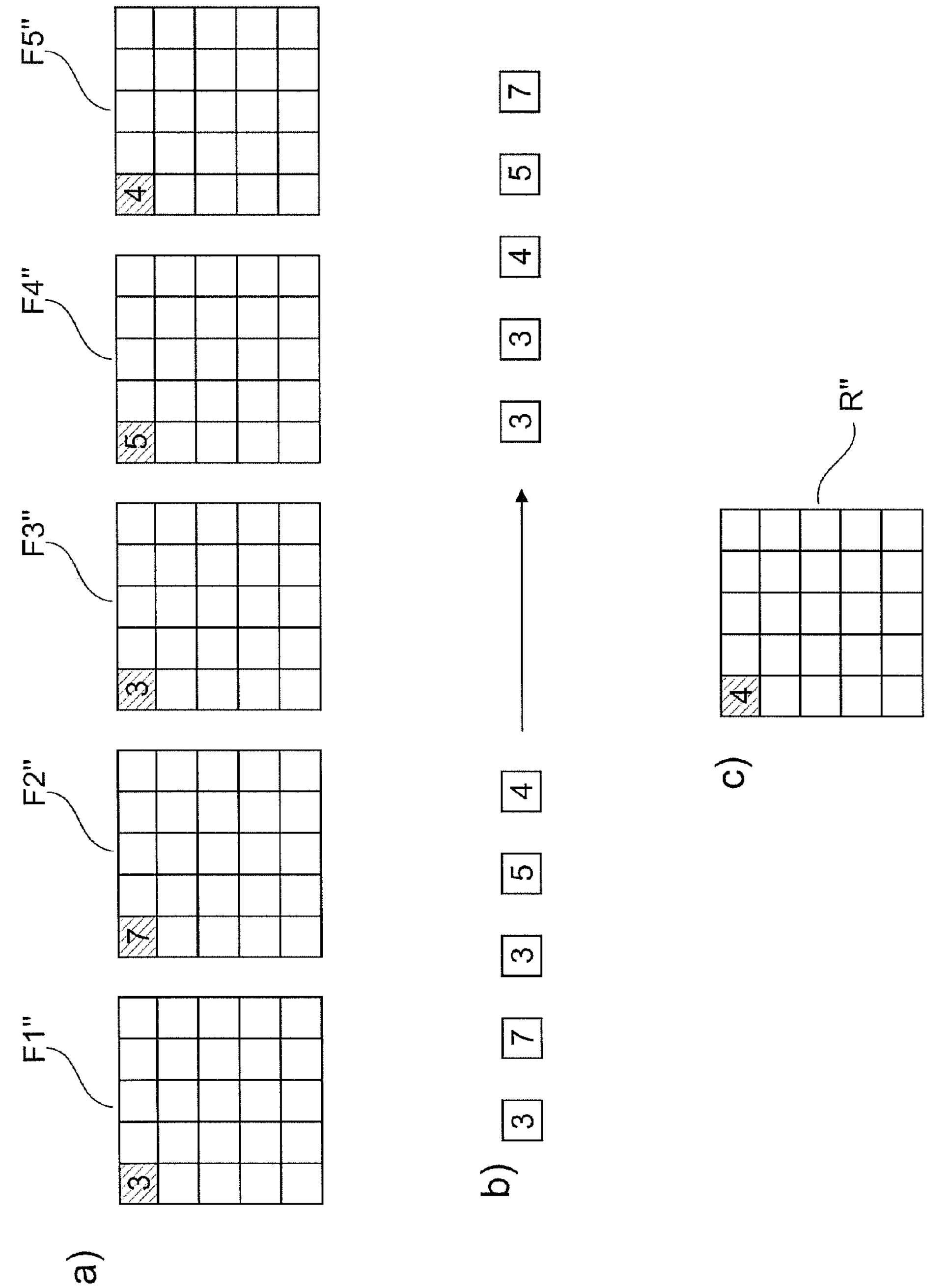
FIG. 5 illustrates image data processing of several individual images using pixel-by-pixel median creation.
Figure 8:
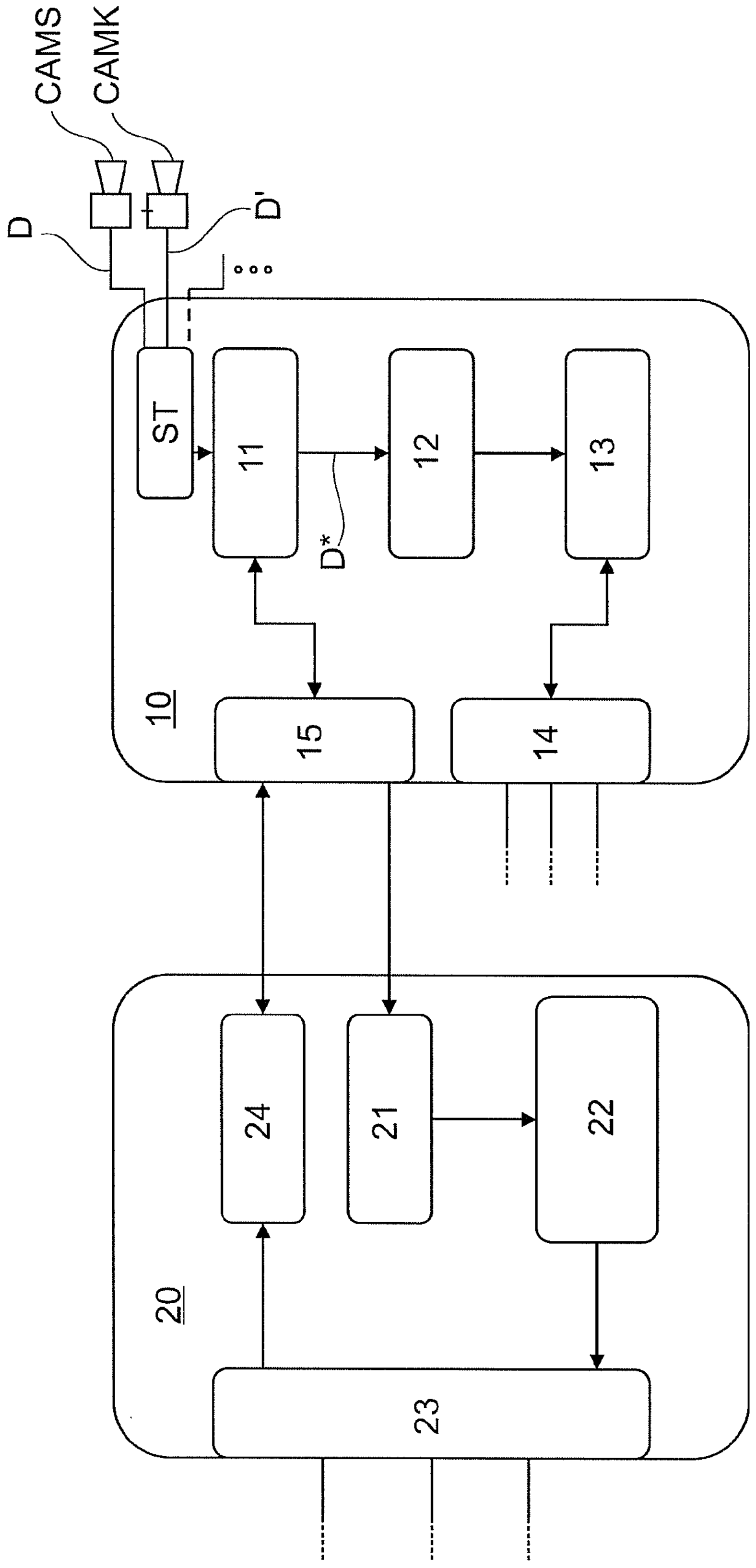
FIG. 8 shows a block diagram for a data processing unit connected to several of the cameras and a video surveillance unit connected to said unit.

Using FIGS. 3 to 5 in particular, the image data preprocessing proposed here is illustrated in which a resulting image or a resulting image sequence of high quality is computed in the data processing unit (see also FIG. 8).

FIGS. 3 *a-c* show as examples three individual images F1, F2 and F3 recorded at different times by the side camera CAMS (compare FIG. 2). A resulting image R, shown in FIG. 3*d*, is computed from said images using image data preprocessing that will be described later in more detail.

As can be seen from FIGS. 3*a* to 3*c*, each of the individual image recordings F1, F2 and F3 contains certain image interference or image errors because of such things as reflections, poor ambient light, foreign objects appearing in the form of persons and/or objects, etc. These are schematic representations that are intended to clarify the individual recording situation. For example, the first individual image recording F1 was made under conditions of sunlight that caused disruptive reflections on the surface of the control panel in the vicinity of the cash dispensing drawer. This situation is illustrated by a beam of light coming from the left. In individual image F2 a person appears who covers the keypad of the automated teller machine. Again in individual image F3 a foreign object appears in the background. So each of the individual images has weak points for the actual image processing to detect manipulation attempts, but which can be largely eliminated by the image data preprocessing described here. A computed overall image R (see FIG. 3*d*) is created in the result that reproduces the control panel and the operating elements there with as little interference as possible and with very high image quality.

The resulting image R is compiled by combining individual image data, where by comparing the individual images with each other the effects of interference are detected and eliminated. For example, many sub-regions can be utilized from individual image F1, except for the area with the reflection, where individual image F1 reproduces the surface texture of the housing and of the operating elements particularly well. Likewise, many sub-regions, except for the area of the keypad and the surroundings in front of the automated teller machine, can be used from individual image F2, where the edges of the housing and of the controls in particular are reproduced clearly recognizable. Individual image F3 also has many usable sub-regions, with the keypad in particular being reproduced without any interference.

The resulting image F3 can then be computed from the different sub-regions and the numerous image components of the individual images F1 to F3. In contrast to the individual images, the resulting image does not reproduce any actual image recording but instead is the equivalent of an optimally computed image composition that shows the captured region, or the control elements, in a form free of interference. The result is to achieve a very high image quality that far surpasses the quality of the individual images. In this way an optimal foundation for the later actual image data evaluation is created.

Methods known from other fields, such as exposure blending for example, can intrinsically be used for pre-processing the image data. Individual images recorded with different exposure times are combined in such a manner that over- and underexposed areas are largely avoided and more details are preserved. The individual photographs from a series of exposures are combined, where the brightest spots in an image are replaced with the corresponding spots from the next darker image.

Figure 9:
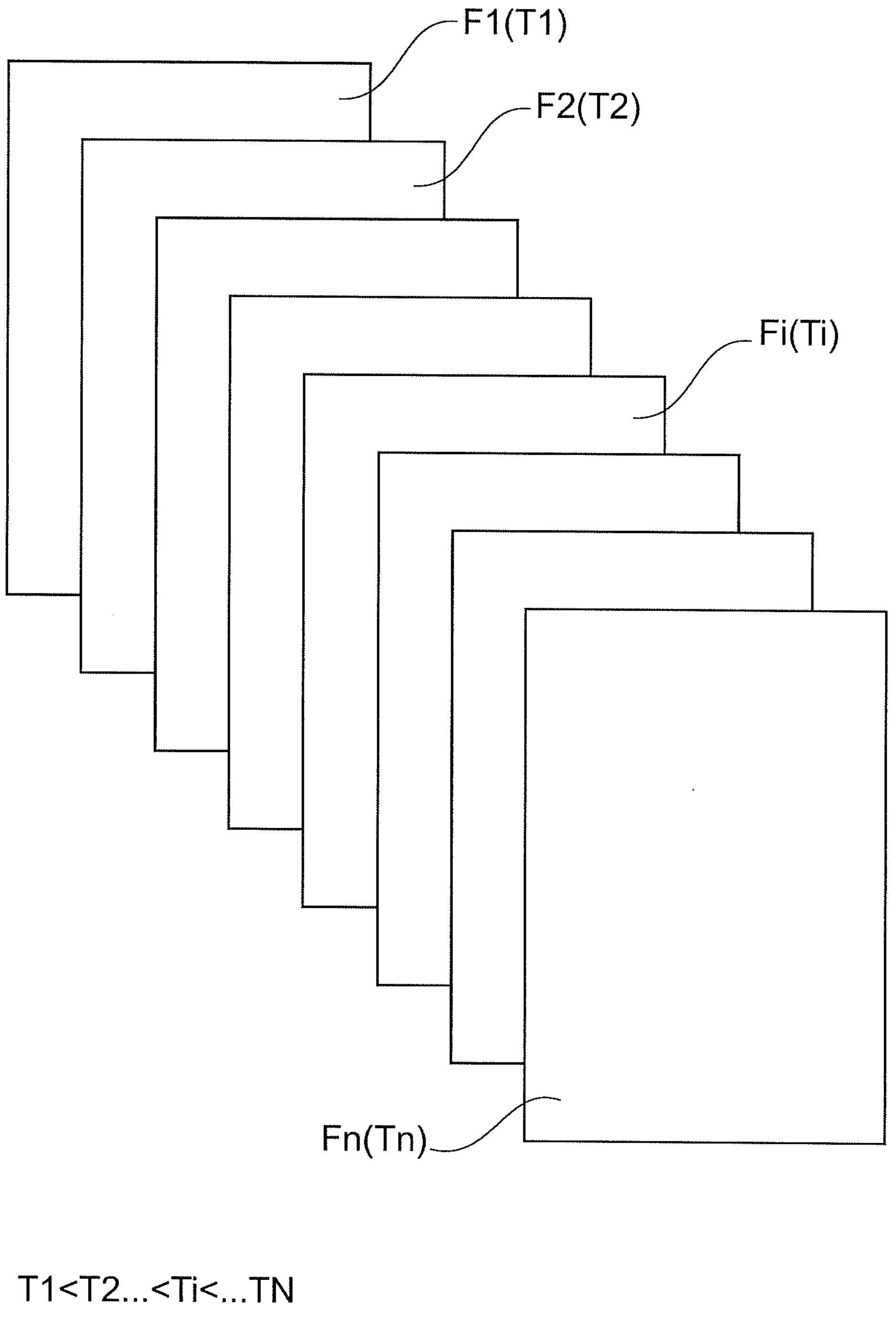
FIG. 9 illustrates individual image recordings following a predefined exposure sequence.
Figure 10:
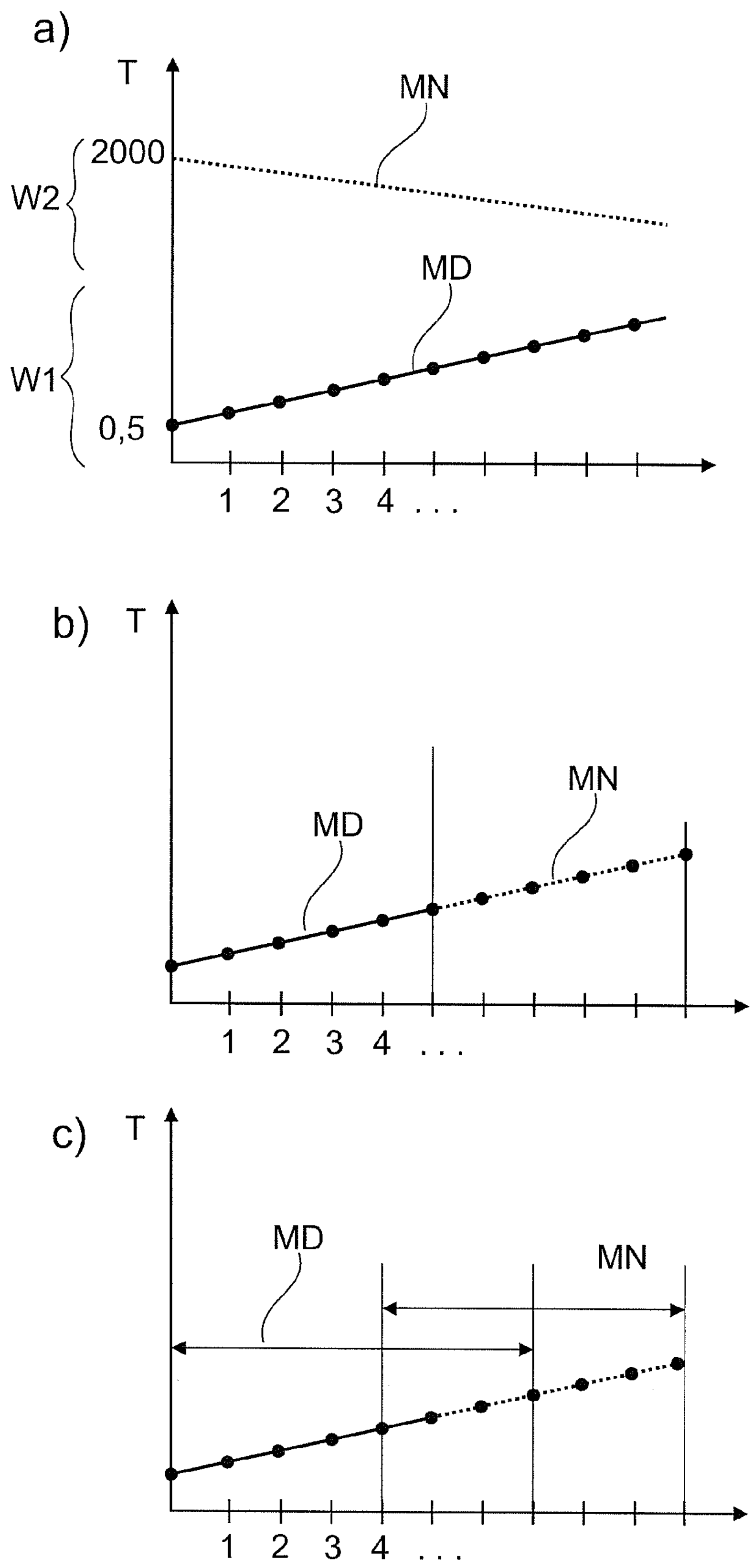
FIGS. 10*a*)-*c*) show different functional sequences in the form of falling and/or rising ramps.

As is illustrated from FIGS. 9 and 10, the several individual image recordings can be generated as a function of at least one predefined function that specifies different exposure times for the individual image recordings. This ensures that no individual image recordings are made with the same exposure time, which in turn is advantageous for exposure blending. FIG. 9 shows a schematic representation of a series of several individual image recordings F1 to Fn illustrating that each individual image recording has a different exposure time T1, T2, . . . Tn. The series (series of exposures) is preferably specified in accordance with a monotonically decreasing or increasing function so that T1<T2<T3 . . . <Tn applies.

FIG. 10*a*)-*c*) illustrate different functional sequences, each with a specific ramp shape:

FIG. 10*a*) shows a first increasing ramp function MD that specifies exposure times in a lower range of values so that an exposure time T=0.5 ms is set for the first individual image "1", and longer exposure times are set in each case for the subsequent individual image recordings. The lower range of values W1 that applies to the day mode goes to a maximum exposure time of 1000 ms for example. FIG. 10*a*) also shows as an alternative a second decreasing ramp function MN that specifies exposure times in an upper value range for the night mode so that an exposure time T=2000 ms is set for the first individual image "1", and shorter exposure times are set in each case for the subsequent individual image recordings. The upper range of values goes to minimum exposure time of T=1000 ms. The decision whether the day mode or the night mode applies can be made on the basis of a threshold value decision. The brightness value and/or contrast value of at least one individual image recording is compared with the threshold value. If the brightness value and/or contrast value is greater than the threshold value, the day mode applies, otherwise it is the night mode.

FIG. 10*b*) illustrates a composite increasing ramp that initially specifies exposure times in the lower range of values in accordance with day mode MD. Then longer exposure times in the upper range of values in accordance with night mode are specified.

FIG. 10*c*) shows an increasing ramp in which the transition from day mode function MD to night mode function MN overlaps. Many other functional progressions are conceivable and can be adapted to the circumstances. In CCTV mode, for example, two to four images per second are made.

The individual image recordings can, for example, be made depending on lighting conditions. Exposure times can also be dependent on different parameters, such as the location of the automated teller machine (indoors, outdoors), type and/or installation location of the camera, lighting conditions, etc.

Edge detection can also be utilized, for example, as illustrated in FIG. 4 that correspond to schematic representations:

Three individual image recordings F1' to F3' that were taken by the side camera CAMS (see FIGS. 1 and 2) at different exposures are shown in FIG. 4 in a first series as partial FIGS. 4*a*1) to 4*a*3). This first series reproduces three differently exposed recordings, in a1) a very brightly exposed recording F1', in a2) a normally exposed recording F2', and in a3) an underexposed recording F3'. The individual images obtained in each case by edge detection are shown in a second series as sub-figures 4*b*1) to 4*b*3). These edge images shown in b1) to b3) should show white edge lines on a black background. In order to satisfy the requirements for patent drawings, these representations are reproduced here inverted, i.e. black edge lines are shown on a white background. The same applies to the total image R' shown in c). As a comparison of the edge images b1) to b3) with the recordings a1) to a3) shows, edge detection of the individual images does not provide an optimal result. In accordance with the invention, a total image R' is computed from the data of the individual edge detections, i.e. from the individual images of FIGS. 4*b*1) to 4*b*3), that correlates with clearly improved edge detection. Overall, all positively detected edges are recovered in the total, or resulting, image R' that cannot be found, or found only partially, in the respective individual images. In addition, artifacts, in particular virtual edges, or “ghost edges”, could be eliminated.

FIGS. 5*a* to 5*c* illustrate a further variation or additional measure for image data preprocessing of individual image recordings F1", F2", F3", etc. Here the image data undergo median formation pixel by pixel. FIG. 5*a*) shows schematically the image data for the first pixel in the respective individual image. As an example, the first pixel in image F1" has the value “3”, in image F2" the value “7”, and in image F3" the value “5”. The next images F4" and F5" have the value “5” or “4” in the first pixel position. As FIG. 4*b*) illustrates, the result is a series, or sequence, made up of the following image data values: 3, 7, 3, 5 and 4 for the first pixel. The values are sorted according to their magnitude so that the following sequence results: 3, 3, 4, 5 and 7. The median of this sequence is consequently the value “4”. This value is entered in the resulting image, or target image R", in the first pixel position (see FIG. 4*c*). Creating the median value, compared with establishing an average value (the average value here would be “4, 4”), has the advantage that any moving objects present in individual images are completely eliminated.

Image data processing, which can also be carried out based on image data from several cameras, is performed in a data processing unit that also performs the actual image evaluation and is shown in FIG. 8.

FIG. 8 shows the block diagram of a data processing unit 10 in accordance with the invention to which cameras CAMS and CAMK are connected, as well as a video surveillance or CCTV unit 20 that is connected to the data processing unit 10. The data processing unit receives the image data D from camera CAMS and image data D' from camera CAMK. Both cameras take individual images at predefined intervals, where the recordings are controlled by a pre-stage or control stage ST. The individual exposure time in particular is predetermined so that a series of individual recordings (exposure series) is generated (see also later description of FIGS. 9 and 10). Then the individual image data are preprocessed in a first stage 11. Here resulting images are generated using the image data processing methods described above or similar methods. The image data D* prepared in this way are of very high quality and are used as input data for a subsequent second stage 12 that serves for feature extraction. A third stage 13 then follows for classification of the processed input data. Stage 13 is in turn connected to an interface 14 via which different alarm or surveillance devices can be activated or controlled. These devices include among others image falsification or manipulation detection (IFD). The first stage 11, which serves for image preprocessing, is in its turn connected to a second interface 15 via which a link to the CCTV unit 20 is established. Remote surveillance or remote diagnosis can be carried out with the aid of this CCTV unit. Detection of manipulation attempts and giving the alarm will be described more fully later.

Figure 7B:
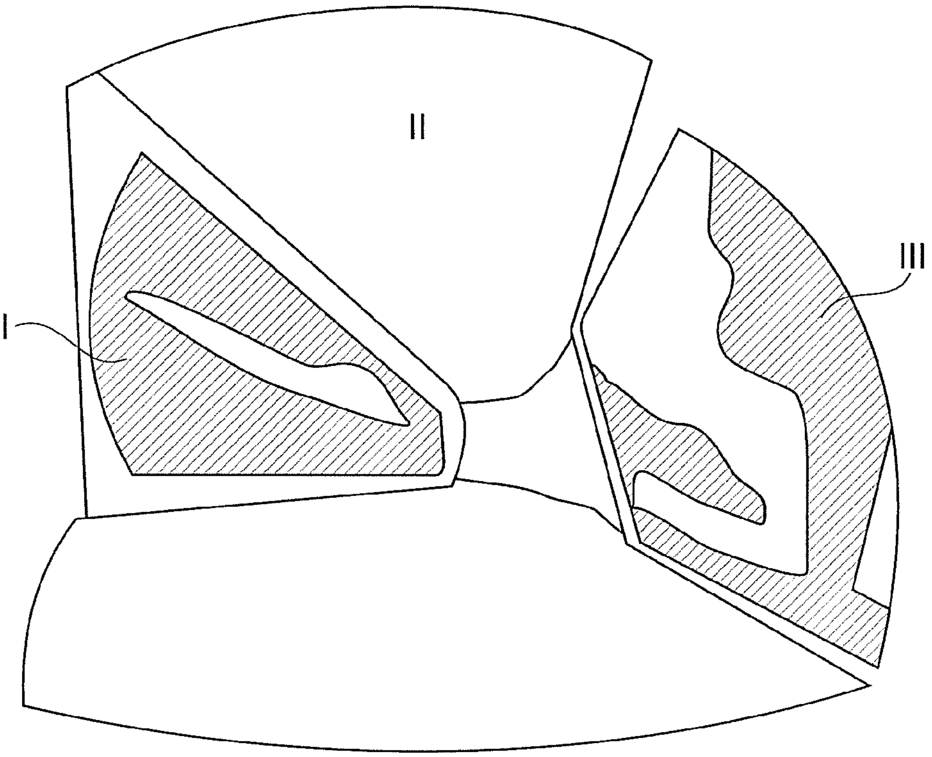
FIG. 7*b* reproduces the coverage area of this camera from FIG. 7*a;*

Reference is made first to FIG. 7 that illustrates a camera installation location in which camera CAMK is integrated directly into the card entry slot 4. In order to achieve good image illumination for this camera CAMK, the lighting L, which is being utilized anyway for the card slit, can be used. Camera CAMK is mounted to the side of the card slit or entry slit that is made of a special light-conducting material K. Lighting L is implemented by one or more light sources, such as light-emitting diodes, where the light produced is taken by way of the light-conducting material to the actual entry slot to illuminate it. The light can be taken coming from above and below so that the card slit is lighted as evenly as possible. The light generated can be optimally adjusted in intensity to meet requirements. The light can also be tinted by the use of colored LEDs and/or colored filters so that it can be matched to the requirements of camera CAMK.

Images of predefined sub-regions are captured and measured optically to detect manipulations caused by outside intervention, changes and the like. Deviations from reference values (normal status regarding image structure, image content, weighting of pixel areas, etc.) can be detected quickly and positively. Different image processing methods (algorithms), or image processing steps (routines), are carried out within a data processing unit described more precisely later (see FIG. 5). The image data processing can be conducted by sub-region.

FIG. 4*b* illustrates the coverage area of camera CAMK segmented into different sub-regions and shows clearly that said coverage area is essentially subdivided into three sub-regions I, II and III.

The first sub-region I principally captures images of the interior region of the card entry slot, the actual card slit, sub-region III covers the outer region of the card entry slot, sub-region II covers the transition region lying between the other two. In conjunction with FIG. 4*a*, the following advantages of the design and installation method described here become clear:

Different types of skimming modules, overlays or manipulations can be detected very precisely through the internal camera position in which camera CAMK is arranged to the side in the card entry slot 4 and captures images of sub-regions I to III. This method of installation makes it possible to segment images corresponding to sub-regions I to III and to measure said sub-regions individually. The difference in contrast between the sub-regions can be put to good use in segmenting the image recording.

The camera CAMK is oriented here in such a way that an image of a person (user or attacker) standing in front of the automated teller machine can be captured with sub-region III. These image data can be compared in particular with those from the portrait camera CAMO (see FIG. 1). Camera CAMK is preferably installed on the same side of the terminal as camera CAMS so that the image data from these two cameras can also be compared.

The lighting L (see FIG. 4*a*) is used especially for the inner region I but also for parts of the transition region II in order to achieve the best possible illumination for the image recordings. Colored lighting in the green range is particularly advantageous because the image sensors, or CCD sensors, of the camera are particularly sensitive to shades of green and have the greatest power of resolution. The lighting L improves object detection, particularly in poor lighting conditions (location, night time, etc.). Additionally, the lighting overcomes any reflections occurring on an overlay to be detected caused by exterior light (e.g. incoming sunlight). The lighting L which is to be provided anyway for the card entry slot represents a reliable light source for camera CAMK. The actual card slit has a different color than the card entry slot so that a greater difference in contrast exists, which improves image evaluation.

Different methods are employed in image data processing, in particular a combination of segmenting and edge detection. The data processing unit (see FIG. 5) consists essentially of the following three stages:

- an image processing stage for preprocessing of the images or data arriving (e.g. for the purpose of shadow removal, edge detection, segmenting),
- a features extraction stage (using blob analysis, analysis of edge position, color distribution, etc.),
- a classification stage (to determine detection features for manipulations).

Data processing will be described in greater detail using FIG. 8 and can be implemented on a PC for example.

Camera CAMK is configured here as a color camera with a minimum resolution of 400×300 pixels. With saturated lighting, a color value distribution-based method to detect overlays and the like can be used. Camera CAMK has a wide-angle lens so that good images of the outer region (sub-region III in FIG. 7*b*) can be captured.

In the example described here at least the cameras CAMS, CAMDA and CAMK mounted in proximity to the control panel are connected to the data processing unit 10 (see FIG. 8) to bring a clear improvement in the detection of manipulations by a combination of image data. This data processing unit described later makes it possible to evaluate the image data generated by the camera optimally in order to detect a manipulation attempt such as an overlay on the keypad 2 or manipulation at one of the cameras immediately and positively and to trigger alarms and deactivation as need be. The following are some of the manipulations that can be positively detected using the data processing unit to be described in greater detail later:

installation of a keypad overlay, installation of a complete overlay at the lower/bottom installation panel, installation of an overlay at the cash dispensing drawer (shutter) and/or installation of objects to record security information, particularly PINs, such as mini-cameras, camera cell phones and similar spy cameras.

In order to detect the presence of overlays, an optical measurement of the imaged elements, such as the keypad 2, is performed inside the data processing unit 10 with the aid of the cameras CAMS and CAMD, in order to detect discrepancies clearly in the event of manipulation. Tests on the part of the applicant have shown that reference discrepancies in the millimeter range can be detected clearly. To detect foreign objects (spy camera), a combination of edge detection and segmenting can be used in order to detect clearly the contours of foreign objects in the control panel (e.g. mini-cameras). The requisite image data processing is performed principally in the data processing unit described hereinafter.

FIG. 8 shows the block diagram for a data processing unit 10 in accordance with the invention to which camera CAMS, CAMD and CAMK are connected, as well as a video surveillance unit, or CCVT unit 20, that is connected to the data processing unit 10. The data processing unit 10 has specifically the following stages or modules:

A pre-stage or control stage ST controls the individual image recordings from the cameras to generate individual image data D or D' from which, using the method described above, preprocessed image data D* can be computed for the actual data evaluation.

For the actual image data processing and evaluation a first stage 11 for image processing of said data, a second stage 12 for feature extraction and a third stage 13 for classifying the processed data are provided. Stage 13 in turn is connected to an interface 14 over which the various alarm or surveillance devices can be activated or controlled. These devices include image falsification or manipulation detection (IFD). The first stage 11, used for image processing, is in turn connected to a second interface 15 over which a link to the CCTV unit 20 is established. Remote surveillance or remote diagnosis, for example, can be conducted with the aid of this CCTV unit.

Control stage ST is responsible for controlling the cameras CAMS and CAMK to generate the individual image data D or D'. The subsequent first stage 11 computes from said data the prepared image data D* (computed complete image data), where here in particular steps such as shadow removal, edge detection, vectorizing and segmenting are carried out. The downstream second stage 12 is used for feature extraction that can be carried out, as an example, using blob analysis, edge positioning and/or color distribution. Blob analysis, for example, is used for detecting cohesive regions in an image and for conducting measurements on the blobs. A blob (binary large object) is an area of contiguous pixels having the same logic status. All pixels in an image that are part of a blob are in the foreground. All other pixels are in the background. In a binary image pixels in the background have values that correspond to zero, while each pixel not equal to zero is part of a binary object.

Then, in stage 13 a classification is made that determines on the basis of the extracted features whether a hostile manipulation has occurred at the self-service terminal, or automated teller machine, or not.

The data processing unit 10 can, for example, be implemented by means of a personal computer that is linked to the automated teller machine ATM or is integrated into said ATM. Besides camera CAMS and CAMK that capture images of the sub-regions of the control panel CP already mentioned, the additional camera CAMO can be installed on the automated teller machine ATM (refer to FIG. 1) that is directed at the user or customer and specifically captures images of his face. This supplementary camera CAMO, also described as a portrait camera, can be triggered to take a picture of the person standing at the ATM when a manipulation attack is detected. As soon as a skimming attack is detected, the system just described can perform the following actions:

Store a photograph of the attacker, when both individual cameras CAMS and/or CAMK and the supplementary portrait camera CAMO can be activated, Alarm the active automated teller machine applications and/or a central management server and/or a person, for example, by e-mail, Introduce counter-measures that include disabling or shutting down the automated teller machine, Transmit data, specifically images, of the manipulation detected, for example over the Internet or a central office.

The operator of the automated teller machine can configure the scope and the type of measures, or countermeasures, taken using the system described here.

As described above, several cameras can be provided, installed directly at the control panel, where cameras CAMS and CAMD capture images of the control panel from the outside, and camera CAMK captures images of the card entry slot from the inside. A supplementary portrait camera can be installed in addition (see CAMO in FIG. 1). Cameras CAMS and CAMD at the control panel and camera CAMK in the card entry are used for the actual manipulation detection. The portrait camera CAMO is used for purposes of documenting a manipulation attempt.

All the cameras preferably have a resolution of at least 2 megapixels. The lenses used have an acquisition angle of about 140 degrees and greater. In addition, the exposure time of the cameras used can be freely adjusted over a broad range from 0.25 msec, for example, up to 8000 msec (8 secs.). In this way, it is possible to adjust to the widest possible range of lighting conditions. Tests by the applicant have shown that a camera resolution of about 10 pixels per degree can be obtained. Referred to a distance of one meter, it is possible to achieve an accuracy of 1.5 mm per pixel. This means, in turn, that a manipulation can be detected reliably using a reference deviation of 2 to 3 mm. The closer the camera lens is to the imaged element or observed object, the more precise the measurement. As a result, a precision of less than 1 mm can be achieved in closer regions.

Depending on where the automated teller machine will be used, for example outside or inside, as well as on the existing light conditions, it may be of advantage to install the camera CAMS in the lateral part of the housing of the automated teller machine ATM or in the upper part of the housing. Various possibilities for surveillance exist depending on the camera position. When monitoring the different elements, or sub-regions, the following in particular can be achieved:

Capturing images of the cash dispensing drawer (shutter) 1 permits checking for manipulation in the form of cash trappers, i.e. special overlays. Capturing images of the keypad area makes it possible to determine manipulation attempts using overlays or changes to security lighting. Capturing images of the installation panel makes it possible in particular to detect complete overlays. Capturing images of the card entry slot 4, particularly using an integral camera, makes it possible to detect manipulations in this area.

It has been shown that discrepancies of 2 mm can be clearly detected in particular at the keypad and the card slot. Discrepancies at the rear outer edge of the installation panel can be detected starting at 4 mm. Discrepancies at the lower edge of the shutter can be detected starting at 8 mm.

The data processing unit 10 (refer to FIG. 8) performs a comparison of the recorded image data D specifically with reference data to detect manipulations. An image of the outer region in particular can be inspected for its homogeneity and compared with the image of the outer region from the control panel camera.

The image data from the different cameras CAMS, CAMD and/or CAMK are also compared with one another to determine, for example, whether individual cameras have been manipulated. If, as an example, camera CAMD was masked, there is a discrepancy with the image recordings from the other cameras. It can be established very quickly from the brightness of the images whether darkening occurs at only a single camera so that manipulation or masking can be assumed. The combination and evaluation of several camera signals or image data increases the robustness of manipulation surveillance and prevention of false alarms. Some of the uses for the image data or information are as follows:

Distinguishing between artificial and natural darkening: if a camera is masked, the image it has recorded is inconsistent with the images from the other cameras. If the natural light (daylight) or the artificial light (area lighting) fails, the effect is the same at all cameras or at least similar. Otherwise the system detects a manipulation attempt.

Detection of deception attacks on the camera array, for example with photographs pasted in front of them: if an individual camera shows a different image (brightness, movement, colors, particularly regarding the outer region), this indicates attempted deception.

Increasing robustness, particularly when the card entry slot is masked: If it is covered, the integral camera (see CAMK in FIG. 4*a*) shows a different image (particularly regarding the outer region) than the rest of the cameras (see CAMS, CAMD in FIG. 1).

Furthermore, the surroundings can be inspected, for example, for emission of the lighting for the card entry slot 4. Connecting the system to the Internet over interface 23 makes it possible to drive the camera, or the different cameras, by remote access. The image data obtained can also be transmitted over the Internet connection to a video server. So the respective camera acts almost as a virtual IP camera. The CCTV unit 20 described above in particular serves the possibility of such video surveillance, where the interface 15 to the CCTV unit is laid out for the following functions:

Retrieving an image, adjusting the image rate, the color model, and image resolution, triggering an event in the CCTV service when preparing a new image and/or possible visual enhancement of detected manipulation in an image provided.

The system is designed such that in normal operation (e.g. withdrawing money, account status inquiry, etc.) no false alarms are created by hands and/or objects in the image. For this reason, manipulation detection is deactivated in the period of normal use of an ATM. Also, time periods of cleaning or other brief uses (filing bank statements, interaction before and after the start of a transaction) should not be used for manipulation detection. Essentially, only fixed and immobile manipulation attempts are preferably analyzed and detected. The system is designed such that surveillance operates even under a great variety of light conditions (day, night, rain, cloud, etc.). Similarly, briefly changing light conditions, such as light reflections, passing shadows and the like are compensated for or ignored in the image processing in order to prevent a false alarm. In addition, events of a technical nature, such as a lighting failure and the like, can be taken into consideration. These and other special cases are detected for classification and solved in particular by the third stage.

The method carried out by the system described for detecting manipulation exhibits in particular the following sequence (refer to FIG. 8):

First, preprocessed total image data D* are computed from the original individual image data D or D' that are used as the starting point for the actual data evaluation.

In a first step, an image is initially recorded, where the camera parameters are adjusted to generate suitable images. In so doing, a series of images, or corresponding image data D or D', is recorded that serves as the basis, or reference, for preprocessing.

Then the image data are processed further, where said data are processed such that they are as suitable as possible for evaluation. For example, several images are combined into a target image and optimized using image enhancement algorithms. The following steps in particular are performed:

Shadow removal, deletion of moving objects, elimination of noise and/or combination of differently exposed recordings.

Some of the adjustments to the cameras are for different exposure times, to eliminate reflections and to compile well lighted areas. The images are preferably compiled over a predetermined period in order to obtain the best possible images for manipulation detection. Feature extraction is performed in a third step (stage 12) in which image analysis methods are applied to the preprocessed images or image data in order to inspect said images or image data for specific features, such as edge positions or color distributions. A number or a value is assigned to each feature that indicated how well the corresponding feature was found in the scanned image. The values are collected in what is known as a features vector.

In a further step, a classification is carried out (Stage 13), i.e. the features vector is passed on to a classification sequence to reach a decision whether manipulation exists or not. Types of classifiers are used that are able to indicate a confidence, i.e. a probability or certainty, with which the decision holds true. The classification mechanisms used may include, for example:

Learning classifier systems, Bayes classifiers, support vector machines (SVM) or decision trees (CART or C 4.5).

The system described here is preferably modular in construction, in order to make different configurations possible. The actual image processing and the CCTV connection are implemented in different modules (refer to FIG. 4).

The system presented here is also suitable for documenting the manipulations detected, or archiving said manipulations digitally. In the event of a detected manipulation, the images recorded, along with corresponding meta-information, such as time stamp, type of manipulation, etc., are saved on a hard disc in the system or on a connected PC. Messages can also be forwarded to a platform for the purposes of reporting, such as error reports, status reports (deactivation, change of mode), statistics, suspected manipulation and/or alarm reports. In the event of an alarm, a suitable message containing the specific alarm level can be transmitted to the administration interface or interface. The following possibilities can additionally be implemented at said interface:

Retrieving camera data, such as the number of cameras, construction status, serial number, etc., master camera data, or adjustment of camera parameters and/or registration for alarms (notifications).

The invention presented here is specifically suitable for reliably detecting hostile manipulations at a self-service terminal, such as an automated teller machine. To this end, the control panel is continuously and automatically monitored by at least one camera. Using image data processing, the elements captured by the camera are measured optically to identify deviations from reference data. It has already been shown that discrepancies in the range of mere millimeters can be identified reliably. A combination of edge detection and segmenting is preferably used for detecting foreign objects so that contours of objects left behind can be clearly detected and identified. In the event of attempted manipulation, countermeasures or actions can be initiated.

The invention clearly increases the reliability with which manipulations can be detected through the combination proposed here of several cameras and intelligent image data processing.

In a preferred embodiment the invention has the following camera arrangement:

One camera at the card entry slot, one camera at the control panel and one camera in the upper area of the automated teller machine for recording portrait photos or videos. In addition, the cameras are connected to the data processing unit previously described. Inside the data processing unit the image data or information acquired by the cameras is used in the following and other ways:

Detection of or distinguishing between artificial and natural darkening: If one camera is masked, the image it recorded is inconsistent with the images from the other cameras. If natural or artificial light fails, the effect appears at all cameras equally. Detection of deception attacks on the camera system, e.g. using stuck on photographs: If one camera shows another image (different brightness, movement, colors, etc.), this indicates a deception attempt. Increasing robustness of masking detection at the card entry slot: If the card entry slot is masked, the integral camera there CAMK shows a different image of the outer region than the other cameras.

The preprocessing of the camera image data described here, in which low-distortion or distortion-free total images are computed from individual recordings results in an increase in the reliability of detection of manipulation attempts and also serves to prevent false alarms.

In summary, a self-service terminal is proposed that has at least one camera to detect manipulation attempts that captures images of one or several elements provided in the control panel, such as a keypad, cash dispensing drawer, card entry slot, and generates image data from several individual image recordings. The at least one camera is connected to a data processing unit that preprocesses the image data (individual image data) generated into a resulting image. The preprocessed image data of the resulting image can be computed from the individual image data, for example, using exposure blending and represent a very good data base for data evaluation for manipulation detection.

The present invention was described using the example of an automated teller machine but is not restricted thereto, rather it can be applied to any type of self-service terminal.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. An automated teller machine that has elements provided in a control panel of the automated teller machine that are made available to users of the automated teller machine, where a plurality of surveillance cameras including a first surveillance camera and a second surveillance camera are provided for surveillance of the automated teller machine, wherein to detect manipulation attempts on the automated teller machine the first surveillance camera captures first images of one or more of the elements provided in the control panel and generates first image data and in that the first surveillance camera is connected to a data processing unit that processes the first image data;

wherein the second surveillance camera is mounted at or in the automated teller machine in proximity to the control panel and captures second images of at least one of the elements of which the first camera captures the first images, the second surveillance camera generates second image data, the data processing unit processes the second image data and compares the first and the second image data to determine if one of the first or the second surveillance cameras have been manipulated.

2. The automated teller machine according to claim 1, wherein at least one of the first or second surveillance cameras generate the image data for the individual image recordings depending on predefined criteria including predefined time intervals and/or under different lighting conditions or ambient brightness.

3. The automated teller machine according to claim 1, wherein at least one of the first or second surveillance cameras generate the image data for the individual image recordings depending on events including events captured by said first surveillance camera or by another camera.

4. The automated teller machine according to claim 1, wherein at least one of the first or second surveillance cameras generate the image data from the individual image recordings, depending on predefined camera settings including predefined exposure times and/or image rates.

5. An automated teller machine (ATM) comprising:

control elements located at a control panel;

at least one surveillance camera for monitoring the control elements; and a data processing unit in communication with the at least one surveillance camera;

wherein:

the at least one surveillance camera is configured to capture images of the control elements and generate image data from multiple individual image recordings to detect manipulation attempts;

the data processing unit is configured to preprocess the image data generated from multiple individual image recordings and to combine said image data into a resulting image for detecting manipulation attempts using image data processing including at least one of segmenting, edge detection, median creation or exposure blending;

the data processing unit is configured to segment the multiple individual image recordings into subregions assigned to at least one imaged element, and process the image data by segment; and the data processing unit is configured to compile the resulting image from the subregions of different ones of the multiple individual image recordings.

6. The ATM of claim 5, wherein the at least one surveillance camera is configured to generate the image data for the multiple individual image recordings based on at least one of predefined time intervals, lighting conditions, or brightness.

7. The ATM of claim 5, wherein the at least one surveillance camera is configured to generate the image data for the multiple individual image recordings based on events captured by at least the first surveillance camera.

8. The ATM of claim 5, wherein the at least one surveillance camera is configured to generate the image data for the multiple individual image recordings based on at least one of predefined exposure times or image rates.

9. The ATM of claim 5, wherein the data processing unit is configured to process the image data from the sub-regions using at least one of data processing methods or different variations of image data processing.

10. The ATM of claim 5, wherein the sub-regions include at least a close-up or inner region, and a surrounding or outer region of the control element imaged.

11. The ATM of claim 10, wherein one of the sub-regions includes a transition region between the inner region and the outer region.

12. The ATM of claim 5, wherein the data processing unit is configured to evaluate the preprocessed image data of the resulting image to detect manipulation attempts using image processing; and wherein the data processing unit has a first stage configured to receive the preprocessed image data of the resulting image for image processing including at least one of shadow removal, edge detection, vectorizing, or segmenting.

13. The ATM of claim 12, wherein the data processing unit includes a second stage downstream from the first stage, the second stage configured for feature extraction including at least one of blob analysis, edge position, or color distribution.

14. The ATM of claim 13, wherein the data processing unit includes a third stage downstream from the second stage and configured for classification.

15. The ATM of claim 5, wherein the at least one surveillance camera includes a control panel camera mounted proximate to the control panel and configured to capture images of at least one of the control elements.

16. The ATM of claim 15, wherein the data processing unit is configured to preprocess the image data into the resulting image.

17. The ATM of claim 5, wherein the data processing unit is configured to generate the multiple individual image recordings as a function of at least one predefined function specifying different exposure times for the multiple individual image recordings.

18. The ATM of claim 17, wherein the at least one predefined function corresponds to at least one ramp function that specifies increasing or decreasing exposure times for the multiple individual image recordings.

19. The ATM of claim 17, wherein one of the predefined functions specifies for the multiple individual image recordings different exposure times within a first lower range of values if at least one of a brightness value or a contrast value of at least one of the multiple individual image recordings exceeds a predefined threshold.

20. The ATM of claim 17, wherein one of the predefined functions specifies for a series of individual image recordings different exposure times within a second upper range of values if at least one of a brightness value or contrast value of at least one of the multiple individual image recordings falls below a predefined threshold.

21. The ATM of claim 17, wherein the exposure times are dependent on at least one of camera type, camera location, or ATM location.

22. An automated teller machine (ATM) comprising:

control elements located at a control panel;

at least one surveillance camera for monitoring the control elements; and a data processing unit in communication with the at least one surveillance camera;

wherein:

the at least one surveillance camera is configured to capture images of the control elements and generate image data from multiple individual image recordings to detect manipulation attempts;

the data processing unit is configured to preprocess the image data generated from multiple individual image recordings and to combine said image data into a resulting image for detecting manipulation attempts using image data processing including at least one of segmenting, edge detection, median creation, or exposure blending;

the data processing unit is configured to segment the multiple individual image recordings into subregions assigned to at least one imaged element and process the image data by segment;

the data processing unit is configured to compile the resulting image from the sub-regions of different ones of the multiple individual image recordings; and the data processing unit is configured to process the image data from the sub-regions using at least one of data processing methods or different variations of image data processing.

* * * * *